US006813844B1

(12) United States Patent
Steinich

(10) Patent No.: US 6,813,844 B1
(45) Date of Patent: Nov. 9, 2004

(54) MAGNETIZATION OF MAGNETIC MEASURING BODIES

(75) Inventor: Klaus-Manfred Steinich, Poering-Zorneding (DE)

(73) Assignee: ASM Automation Sensorik Messtechnick GmbH, Moosinning (DE)

( * ) Notice: Subject to any disclaimer, the term of this patent is extended or adjusted under 35 U.S.C. 154(b) by 0 days.

(21) Appl. No.: 10/385,216

(22) Filed: Mar. 10, 2003

(30) Foreign Application Priority Data

Mar. 8, 2002 (DE) ........................................ 102 10 326

(51) Int. Cl.[7] ................................................ G01B 7/04

(52) U.S. Cl. ........................................................ 33/708

(58) Field of Search .................. 33/706, 708; 335/285, 335/209; 439/38

(56) References Cited

U.S. PATENT DOCUMENTS

| | | | | | |
|---|---|---|---|---|---|
| 4,161,832 | A | * | 7/1979 | Bergamini | 40/451 |
| 4,222,084 | A | * | 9/1980 | Nakagawa et al. | 360/119 |
| 4,245,261 | A | * | 1/1981 | Shilling et al. | 360/17 |
| 4,729,050 | A | * | 3/1988 | Koyama | 360/125 |
| 5,113,575 | A | * | 5/1992 | Fedeli et al. | 29/603.08 |
| 5,799,234 | A | * | 8/1998 | Furuya et al. | 399/277 |
| 6,145,214 | A | * | 11/2000 | Shimano et al. | 33/706 |
| 6,629,371 | B1 | * | 10/2003 | Shirai et al. | 33/290 |
| 6,636,390 | B2 | * | 10/2003 | Funayama et al. | 360/317 |

* cited by examiner

*Primary Examiner*—Christopher W. Fulton
(74) *Attorney, Agent, or Firm*—Head, Johnson & Kachigian

(57) ABSTRACT

For easy production of an alternately magnetisable measuring scale there is proposed for example a C-shaped magnetisation head 52 in which the magnetic flux through its air gap in which the measuring scale is disposed can be definedly switched on and off.

34 Claims, 12 Drawing Sheets

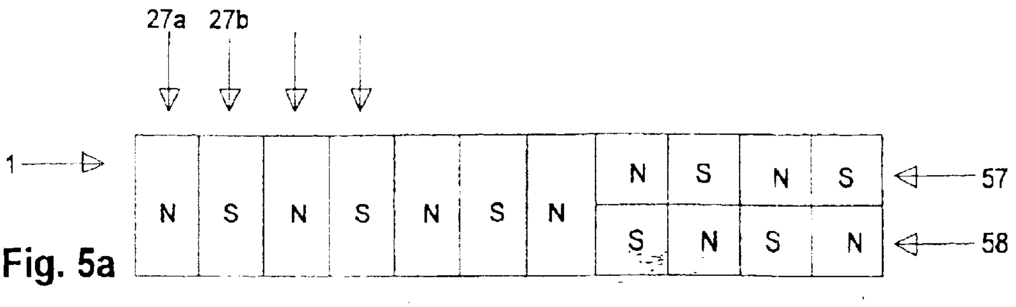
Fig. 5a
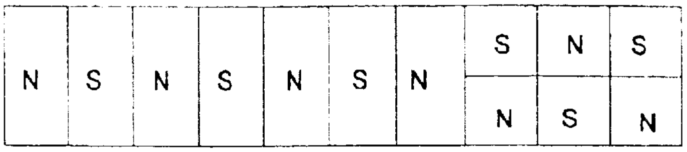
Fig. 5b
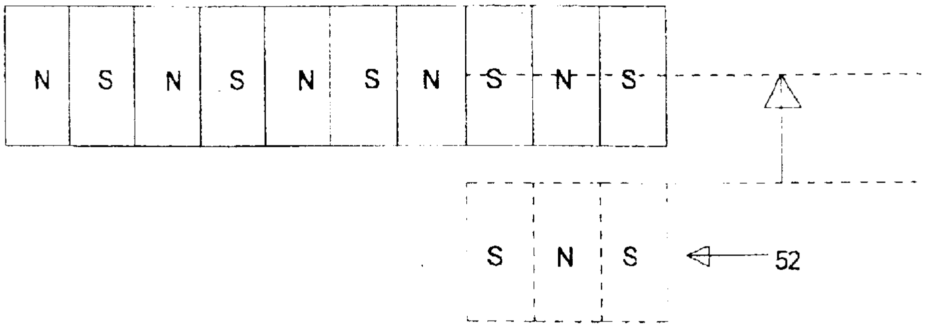
Fig. 5b1
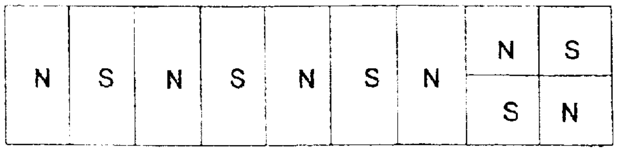
Fig. 5c
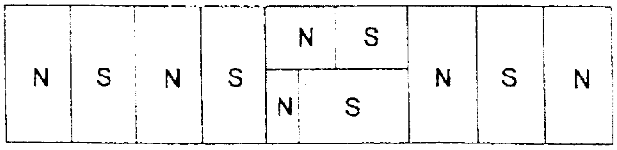
Fig. 5d
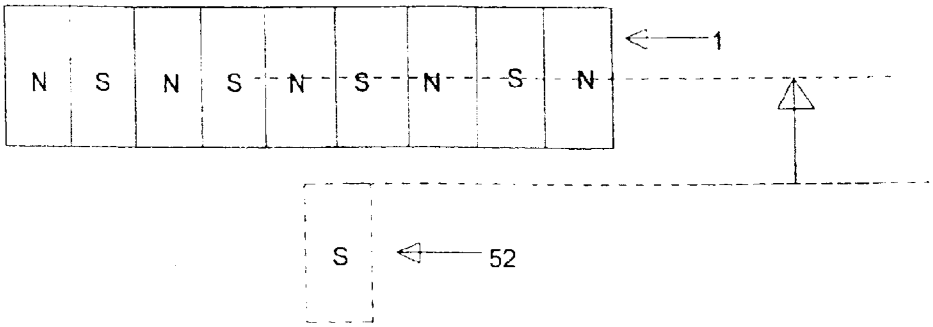
Fig. 5d1

MAGNETIZATION OF MAGNETIC MEASURING BODIES

CROSS-REFERENCE TO RELATED APPLICATION

This application claims priority to German Application 10210326.7 filed 08 Mar. 2002.

FIELD OF THE INVENTION

The invention concerns a magnetic measuring structure with portions which are magnetised alternately in the longitudinal direction, referred to herein for the sake of brevity as a 'measuring scale', for a length measuring apparatus, and a process for the production thereof.

BACKGROUND OF THE INVENTION

When arranged on the periphery of a cylinder such a length measuring apparatus can naturally also be used basically for angle measurement purposes.

The length measuring apparatus includes on the one hand a measuring scale on which the units of length are recorded and a sensor unit which is moved relative to the measuring scale in the measuring direction. Generally in that case the arrangement registers the number of units of length which are covered on the part of the sensor unit in that relative movement, that is to say how many units of length the sensor unit entirely or partially travels over. The absolute position at the end of the relative movement can only be calculated if the starting position, prior to the relative movement, is known.

For that purpose the straight or curved measuring scale has respective codings, generally uniform and periodic codings, which are arranged in succession in the measuring direction, only in one single track or in a plurality of tracks in mutually juxtaposed relationship, with the pitch spacing being different from one track to another. In addition, provided along the measuring distance, in general mostly only at a single lengthwise position, there is a reference mark, the position of which represents the absolute zero position and over which therefore the sensor unit first has to travel once, for setting the apparatus in operation, in order thereby to predetermine an absolute start value.

In addition however length measuring apparatuses which provide for absolute measurement are also known. In that case, by virtue of the design configuration of the measuring scale divisions and the evaluation procedure involved for example by just once setting the sensor to any location on the measuring scale it is possible directly to ascertain the absolute position of the sensor on the measuring scale without relative displacement of the sensor with respect to the measuring scale and without the need to initially move the sensor to a reference point on the measuring scale.

Irrespective of whether the system involves an incremental or an absolute length measuring system, the measuring apparatus according to the invention includes one or more or a multiplicity of magnets which implement modulation of the signal to be detected. For example the individual units of length are applied in sequence in the measuring direction to the measuring scale, in the form of different magnets or magnetisations, by way of example in the form of segments which are each of equal length in the measuring direction and which involve alternate poles.

The sensor unit which is moved relative thereto in the measuring direction and which, besides the actual sensor, generally already includes at least parts of the electronic evaluation system, detects the magnetic field which constantly alters in the measuring direction, as an analog signal in the form of a sinusoidal oscillation or a sine-like but uniform oscillation. A substantial advantage of this method is the fact that the sensor can be moved at a spacing relative to the measuring scale, that is to say in a contactless mode. The measuring scale and also the sensor are thus not subjected to any mechanical wear. In addition there is only a limited need for parallelism of the direction in which the sensor is guided relative to the direction in which the measuring scale extends.

In particular the spacing between the sensor and the measuring scale which should be at about 1.0 mm may also change somewhat.

The measuring scale may have one or a plurality of mutually juxtaposed tracks which each have the magnetised segments of alternate poles.

Thus, the one track, as a pure counting track, can be equipped with regular sequences of magnetisation portions while the other track serves to mount reference marks—in punctiform or region-wise manner—, that is to say reference marks for the purposes of marking for example the absolute zero point, the end of the measuring scale or the like. Such a reference track may be non-magnetised or additionally regularly magnetised in the lengthwise region between the reference marks.

Likewise, absolute encoding of the measuring structure can be effected by means of a plurality of mutually juxtaposed tracks, in which case then the length of the differently poled magnetised segments on the individual tracks is mostly of different magnitude.

Hereinafter—without however limiting the invention thereto—consideration will be based on the specific case where both the regular sequences of magnetisations for registering a distance covered and also at least one irregular sequence of magnetisations for producing reference marks are present on one and the same track. For that purpose, the width of the track can also be divided into two narrow sub-tracks, in the region of the irregular sequences.

In that respect, the problem which arises is that of magnetising the measuring scale alternately, regularly and irregularly, with the lowest possible level of unwanted stray flux during the magnetisation operation so that, in the later operation of detecting the alternate magnetic segments of the measuring scale, the result achieved is a sinusoidal electrical signal which is as precise as possible, and which has as few harmonics as possible.

In this connection, it should be explained (see FIG. 1*b*) that a sensor which moves at a given spacing above the surface of the measuring structure which has the magnetised segments of differing poles, in the longitudinal direction thereof, detects the gradient, that is to say the first derivative, of the magnetic field lines which extend in a U-shape from each pole to the respectively adjacent poles, and in so doing pass with their free ends into and out of the surface of the measuring structure. Accordingly, the result produced is an electrical signal which is sinusoidal with a zero passage or a reversal in the curvature of the sinusoidal curve at each of the limits between two differently polarised magnetic segments.

For that reason, in regard to the regular sequence of segments, and the irregular segment sequence disposed therein, which are to be used as reference marks, care is to be taken to ensure that those irregular segments are not so long that they achieve double the length of the regularly arranged segments, but are at a maximum only 1.5 times, in particular only 1.3 times, that length (see FIG. 1*b*).

SUMMARY OF THE INVENTION

Based on that situation, the object of the present invention is to provide a process and an apparatus for producing a magnetic measuring scale which satisfies the specified properties in respect of the electrical measuring scale, in spite of the apparatus being of a simple and inexpensive structure and the process being simple and inexpensive to implement.

Due to the L-, C-, U-, F- or 8-shaped configuration of the magnetisation head which acts as a flux guide portion and which in its extent at a location has the effective magnet, a permanent magnet or a separately excitable, in particular electrically excitable, magnet, the band to be magnetised can be introduced into the gap (air gap) of the for example C-shaped configuration of the magnetisation head and thus the magnetic flux can be introduced into the measuring scale to be magnetised, with a scatter effect which is as slight as possible.

In addition magnetic induction into or through the measuring scale can be altered by—mechanical or electrical—influencing of the magnet of the magnetisation head, even without having to move the magnetisation head away from the measuring scale.

To provide for the mechanical influencing effect, it is sufficient to move the magnet out of the alignment of the for example C-shaped flux guide portion, that is to say the remainder of the magnetisation head, or it is sufficient to pivot the magnet so that the pole direction thereof is; no longer aligned with the direction in which the corresponding limb of the magnetisation head extends.

An installation for the magnetisation of such measuring scales includes at least one magnetisation head for magnetisation of the measuring scale and a first and a second motion unit, of which the first moves the measuring scale in the longitudinal direction and the second moves the magnetisation head or a part thereof in order to alter the magnetic flux. Therefore, as described hereinbefore, the second motion unit can displace or rotate the magnet relative to the motion head, but it can also mechanically displace parts of the rest of the magnetisation head, which in fact act as flux guide portions, in particular it can lift them off the measuring scale to be magnetised, by pivotal movement etc. Instead, the second motion unit can also displace the entire magnetisation head in a transverse direction relative to the longitudinal direction of the measuring scale, that is to say it can lift it off the top side of the measuring scale, or it can move it away in a transverse direction, parallel to the direction of the surface, from the measuring scale.

If, upon magnetisation, the measuring scale remains arranged stationarily and only the magnetisation head is moved, the first and second motion units can respectively engage the magnetisation head or parts thereof and in particular can be combined to form a single motion unit.

The magnetisation installation may also have a second magnetisation head so that the regular sequences of differently magnetised segments can be produced with the one magnetisation head and the irregular sequences can be produced with the other magnetisation head.

In that respect the magnetisation head for production of the regular sequences may be in particular a pole wheel which rolls in the longitudinal direction on the measuring scale and which along its periphery has alternately differently magnetised regions.

Another installation serves for the—preferably regular—different magnetisation of a measuring scale which however must be uniformly pre-magnetised, in which therefore as the initial condition for example the top side of the substantially band-shaped measuring scale always forms a North pole and the underside always forms a South pole.

A measuring scale which is pre-magnetised in that way can be polarised in opposite relationship in portion-wise manner by the application of a magnetisation head, For that purpose, a magnetisation head is moved to the corresponding side of the measuring scale; the magnetisation head is of the polarity of the side of the measuring scale, in opposite relationship thereto, and therefore produces there the opposite polarity.

So that this happens in a portion-wise manner, provided between the measuring scale and the corresponding magnetisation head is a cover of non-magnetisable material which has openings only at those locations, that is to say generally at each second longitudinal portion, at which magnetisation reversal of the measuring scale is desired.

As a result of that arrangement, the magnetisation head used can extend over a plurality of and in particular a multiplicity of portions of the measuring scale and in particular can be in the form of a ring pole, that is to say with the same polarity over the entire periphery, which rolls on the surface of the measuring scale. The cover is either arranged stationarily on the measuring scale and is moved therewith relative to the magnetisation head or, in the case of a ring pole, it is arranged concentrically around the pole and rolls together with same on the surface of the measuring scale.

From the point of view of the operating procedure of the process involved—to afford manufacture which is as inexpensive as possible—the measuring scale to be magnetised can firstly be produced with the regular sequences of differently magnetised segments, and in that case preferably over the entire desired length of the later measuring scale, that is to say when dealing with portions of the measuring scale which have been previously cut to length, that entire length, preferably in the form of an endlessly manufactured band which is regularly alternately magnetised throughout.

In that respect the magnetisation operation is preferably also effected in a continuous process, preferably by means of an operation involving rolling a pole wheel, which can be effected more quickly than discontinuous, portion-wise production of the individual segments by means of magnetisation, although under some circumstances the latter procedure can afford a better quality in respect of magnetisation of the individual segments.

Then the irregular sequences of segments are applied, more specifically either on previously non-magnetised regions of the measuring scale or preferably by reversal of the magnetisation of the regular markings previously present in those lengthwise regions.

The latter is to be preferred in particular when the irregularly marked regions do not extend over the entire track width but only over a sub-track, in the transverse direction.

The irregular sequences are preferably not applied by means of rolling a pole wheel but they are rather applied by putting a magnetisation head from above on to the top side of the measuring scale or by pushing a C-shaped magnetisation head on to the measuring scale in the transverse direction at the appropriate longitudinal position in order thereby to effect magnetisation.

The magnetic flux into the measuring scale which magnetises it or reverses the magnetisation thereof in a segment in the desired manner should preferably occur only when the magnetisation head is in the desired relative position with respect to the measuring scale.

In order to avoid the need to remove the magnetisation head in the transverse direction on every occasion, that is to say between the operation of magnetising two different segments, and then re-fitting it in the new longitudinal position, but in order to have to effect only a relative displacement in the longitudinal position, then, instead of transverse displacement of the magnetisation head, it is also possible for the magnetic flux to be interrupted in another way:

One possibility: the magnet which is effective in the magnetisation head is a separately excited, in particular electrically excited magnet, the excitation of which can be switched off for a short time in the change in relative position of the magnetisation head.

The other possibility provides that the magnet which is effective within the magnetisation head and which, in the case of a C-shaped magnetisation head, is preferably disposed in the connecting central limb, is so altered in its position that there is no longer any magnetic flux in the magnetisation head, that is to say the magnet is either moved away out of its aligned position in the magnetisation head or it is at least pivoted in such a way that the actual pole direction of that magnet is no longer in conformity with its reference or target pole direction which is generally the direction in which the limb carrying the magnet extends, but differs therefrom in particular through 90°.

A further possibility involves making the magnetisation head in the shape of an 8, that is to say with three connecting limbs. If in that case the magnet of the magnetisation head is arranged in one limb, and a further connecting limb has the gap (air gap) for passing the measuring scale therethrough, then the remaining third limb can be provided with a removable central region. If the third limb and also its removable region act as a flux guide portion, that is to say comprise material which can be well-magnetised, then that third limb can be activated and deactivated in respect of its function as a flux guide portion, by being removed and moved back again.

When the flux guide portion is activated the ring of the magnetic flux lines is embodied from the magnet by way of the third limb and back to the magnet.

When the flux guide portion in the third connecting limb is deactivated, the ring is embodied by the magnet, the measuring scale in the air gap and back to the magnet, therefore strong magnetic induction occurs in the air gap and thus in the portion of the measuring scale which is disposed there.

In the case of endlessly manufactured, regularly magnetised bands, the operation of cutting the measuring scale to the desired length can be effected optionally prior to or after the application of the irregular sequences of magnetised segments.

A particularly preferred embodiment of a magnetisation installation would therefore firstly provide an endlessly supplied band, by means of a first magnetisation head in the form of a pole wheel in a continuous process, with a regular continuous sequence of magnetised segments which thereafter, in the direction of travel of the band through the installation, are provided with the irregular sequences of segments by means of magnetisation reversal at the desired longitudinal positions by means of a second, discontinuously operating magnetisation head, and thereafter it is cut to length at the necessary locations.

BRIEF DESCRIPTION OF THE DRAWINGS

An embodiment according to the invention is described by way of example in greater detail hereinafter with reference to the drawings in which:

FIG. 5 shows different magnetisation patterns on magnetised measuring scales as a plan view.

BRIEF DESCRIPTION OF THE PREFERRED EMBODIMENT

Figure 1A:
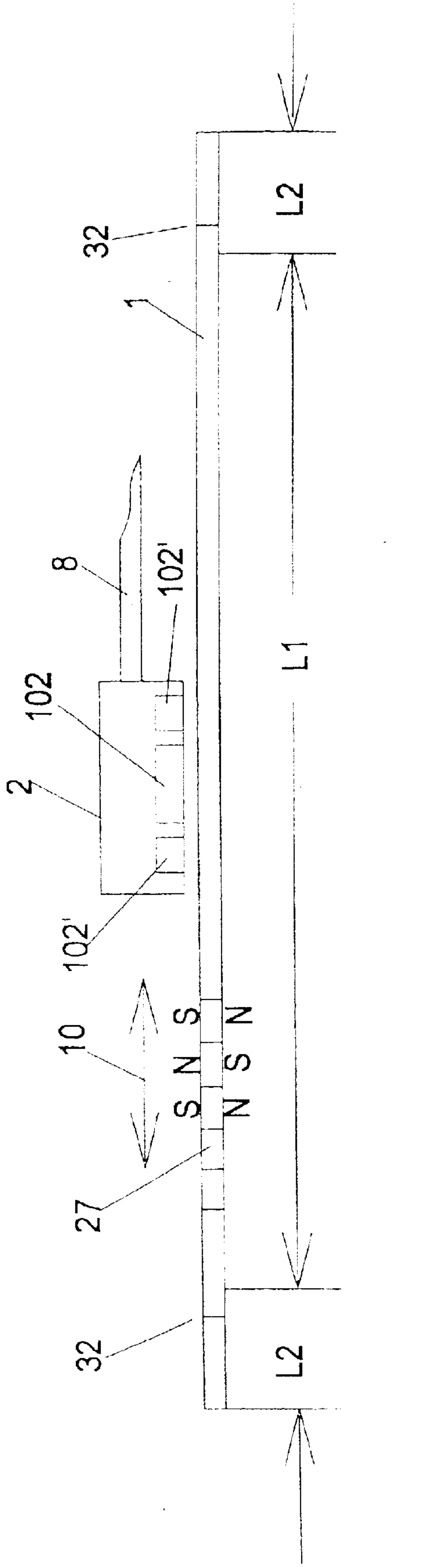
FIG. 1*a* is a view showing the principle of a measuring apparatus.

FIG. 1*a* is a view showing the principle of a measuring apparatus comprising a measuring scale 1 which extends in the longitudinal direction 10 and which has the segments 27*a, b* which occur in succession in the longitudinal direction 10 and which are arranged regularly or irregularly and which are magnetised alternately, that is to say for example on the top side a North pole following a South pole, as shown for example in FIG. 5, wherein the magnetisation axis of the segments extends perpendicularly, that is to say transversely with respect to the longitudinal direction 10.

The measuring scale 1 is intended to permit position detection at least along the length L1 and in the embodiment shown in FIG. 1*a*, outside the measuring region L1, in the lengthwise regions L2 adjoining same, there are to be special markings in the form of band end marks 32—for example in the form of irregular magnetic sequences.

The magnetised segments 27*a, b* which are magnetised differently for the scale 1 in the longitudinal direction 10 and which are shown by way of example in FIG. 5 are detected by a sensor unit 2 which moves in the longitudinal direction 10 relative to the measuring scale 1 or which is connected to the movable component of a machine. The sensor unit 2 includes for example at the center in the longitudinal direction a sensor 102 for counting the regularly successively occurring segments 27*a, b*, . . . in the lengthwise region L1 and thus the progress in the direction of movement, and in addition in front of and behind the sensor 102 in the direction of travel, special sensors 102' which are designed for recognising the band end markings 32.

The signals produced by the sensor unit 2 are transmitted for example by way of a cable 8 to an evaluation unit (not shown) which—starting from an absolute marking such as for example the band end marking 32—displays the segments 27*a, b*, . . . over which the sensor unit 2 has passed and thus displays the instantaneous position of the sensor unit 2 in the longitudinal direction with respect to the measuring scale 1.

Measuring apparatuses of that kind are known, in which respect the present application is concerned with production of the differently marked segments 27*a, b* on the measuring scale 1.

Figure 2A:
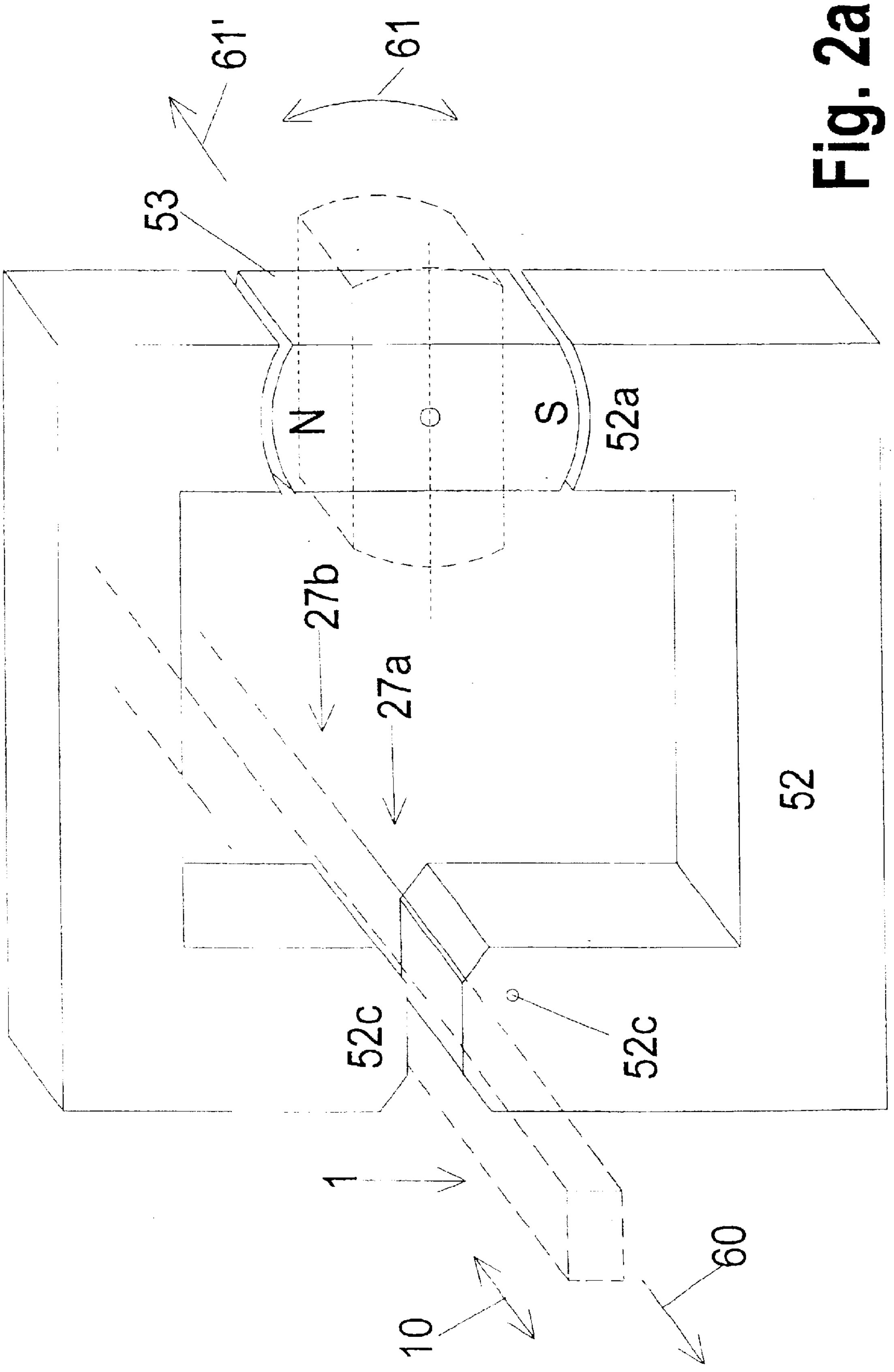
FIG. 2 is a view in principle showing a magnetisation installation in various embodiments.

In this respect FIG. 2*a* shows a magnetisation installation with a magnetisation head 52 with which an individual segment 27*a, b* of the magnetisable measuring scale 1 can be magnetised in the desired manner, that is to say with a North pole or South pole facing upwardly, that is to say for example detectable on the top side of the magnetisable layer 1*a*.

The magnetisation head 52 is of a C-shaped configuration, with a magnet 53 in its connecting central limb 52*a*, the pole direction of which, that is to, say the direction from the North pole to the South pole, in the deactivated condition is in conformity with the direction in which that limb extends. The rest of the magnetisation head 52 substantially comprises suitably shaped flux guide portions, that is to say a material which has a very good conducting action in respect of the magnetic flux.

The gap between the mutually facing free ends 52*c* of that magnetisation head is just large enough that the measuring scale 1 which is to be magnetised and which is of a defined, uniform thickness can be moved along therebetween relative thereto in the longitudinal direction 10.

In the embodiment shown in FIG. 2*a* that relative movement in the longitudinal direction 10 is implemented by a first motion unit 60 which engages the measuring scale 1. In contrast the magnetisation head 52 is stationary.

So that, after a segment 27*a*, a successive segment 27*b* which involves a different pole configuration can be magnetised, prior to displacement from one segment to the next the magnetic flux through the gap between the free ends 52*c* of the magnetisation head 52 is interrupted by a procedure whereby the magnet 53 is rotated through 90° out of its activated pole direction of being aligned with the corresponding limb 52*a* of the magnetisation head 52, then the relative displacement in the longitudinal direction 10 is effected and then the magnet 53 is either turned back through 90° again into the aligned position or it continues its rotational movement, depending on the desired pole direction in the respective next segment.

An alternative to pivotal movement or rotational movement of the magnet 53 by means of such a second motion unit 61 is displacement of the magnet, for example in the longitudinal direction 10, out of the plane of the limb 42*a*, as is indicated by the second motion unit 61'.

Figure 2B:
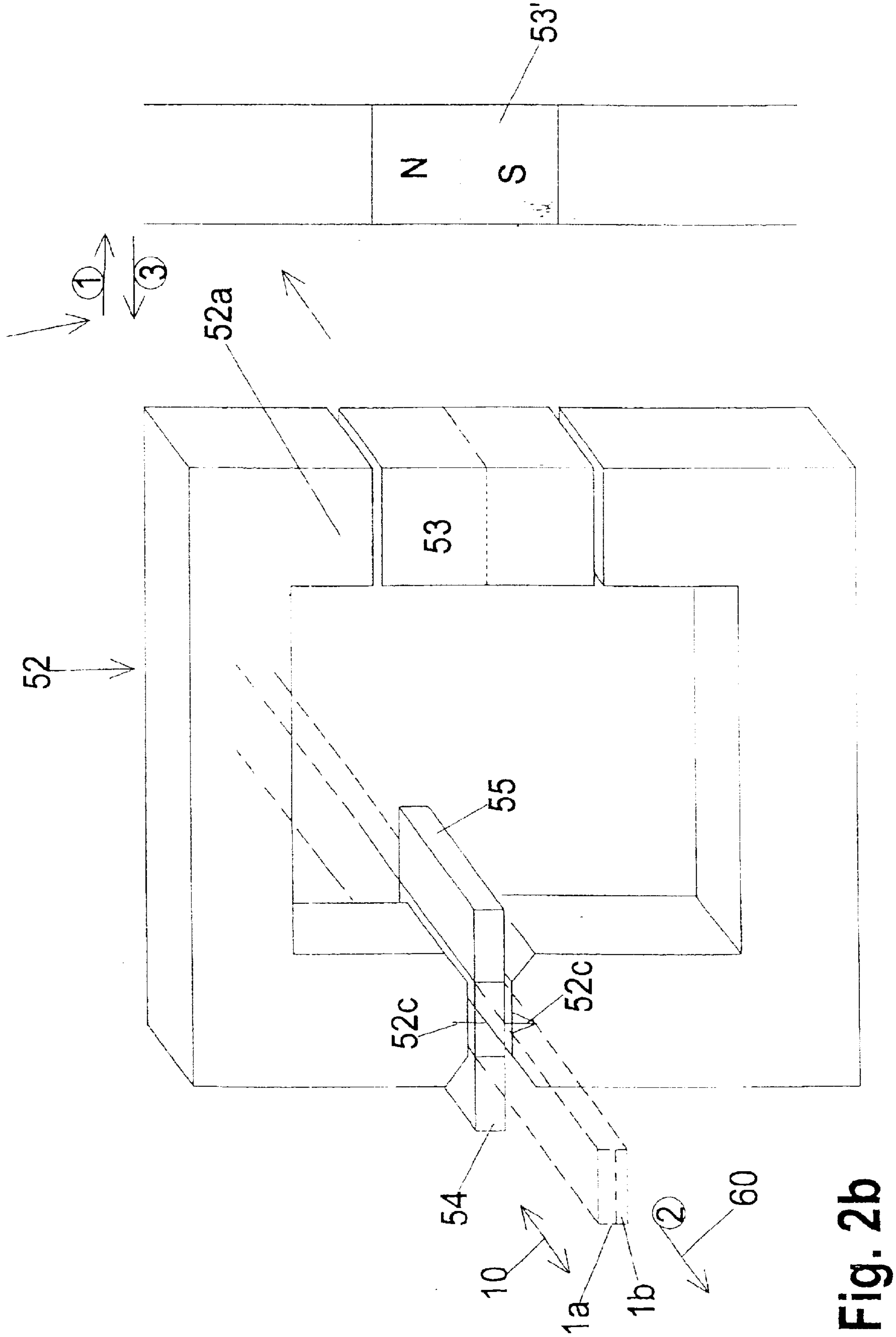
Figure 3A:
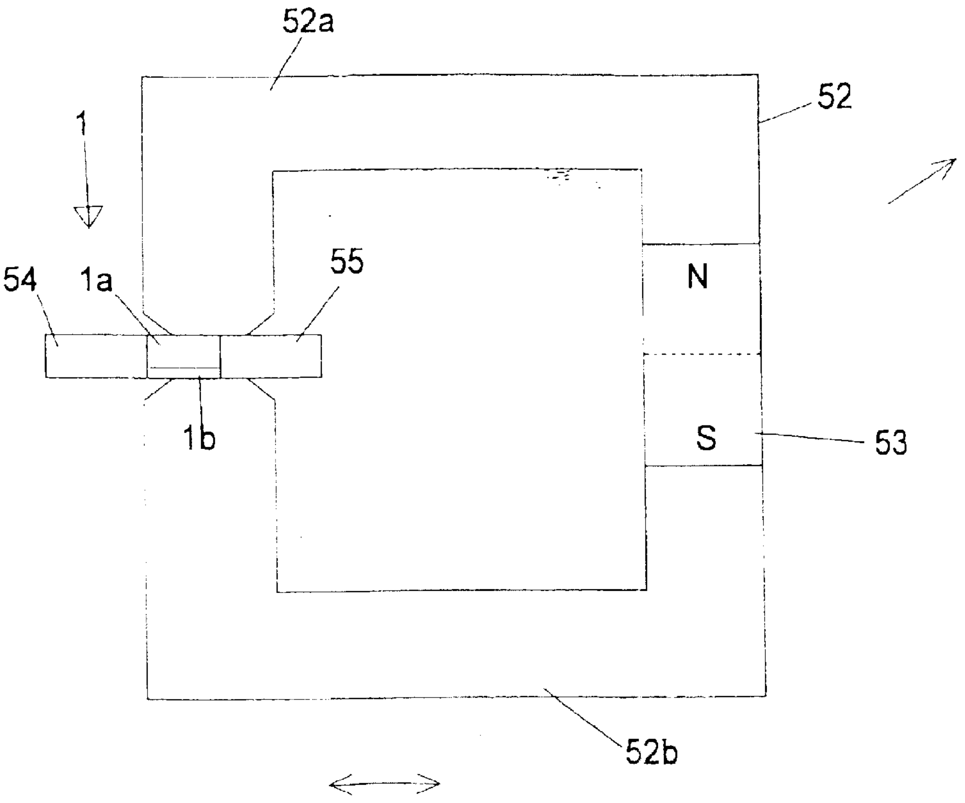
FIG. 3 shows different structural forms of magnetisation heads.

FIG. 2*b* is a perspective view and FIG. 3*a* is a view considered in the longitudinal direction of a further structure for interrupting the magnetic flux between the free ends 52*c* through the measuring scale 1.

In this case the magnet 53' is arranged for example fixedly in the magnetisation head 52 and for the deactivation operation the entire magnetisation head 52—insofar as it is C-shaped and thus extends from above and from below to close to the measuring scale 1—is withdrawn from the measuring scale 1 transversely to the longitudinal direction 10 in the direction of the transverse extent of the top side of the measuring scale 1, that is to say the measuring scale 1 is moved out of the operative region of the magnetisation head 52 (arrow ①) then the measuring scale 1 is displaced in the longitudinal direction (arrow ②) and then the head 52 is moved back (③).

In order in that situation to minimise magnetic scatter flux, arranged laterally beside the measuring scale 1 at least on the side to which the magnetisation head 52 is withdrawn is a flux guide portion 54, 55, by means of which the magnetic flux is transferred from one free end to the other free end 52*c*, with the smallest degree of scatter.

Preferably in that respect the flux guide portion 55 is spaced from the measuring scale 1 during the magnetisation operation and is only moved laterally to the measuring scale 1 again prior to the magnetisation head 52 being moved away from the measuring scale 1.

In the case of a magnetisation head 52 which approaches the measuring scale 1 only at one side, that is to say for example only from above, the removal movement can also be effected perpendicularly to the top side of the measuring scale 1.

Upon deactivation of the magnetic flux by means of movement of the entire magnetisation head 52 by a second motion unit 61", as shown in the example of FIG. 2*b*, it is recommended that the first motion unit 60 for the relative movement in the longitudinal direction 10 between the measuring scale 1 and the magnetisation head 52 should also be caused to engage the magnetisation head, as that affords the possibility of combining first and second motion units 60, 61" together in a single motion unit, that is to say not moving one of the two components (measuring scale 1 or magnetisation head 52) and causing only the other component to successively perform both movements, that is to say both in the longitudinal direction and also in the transverse direction with respect thereto.

Figure 3B:
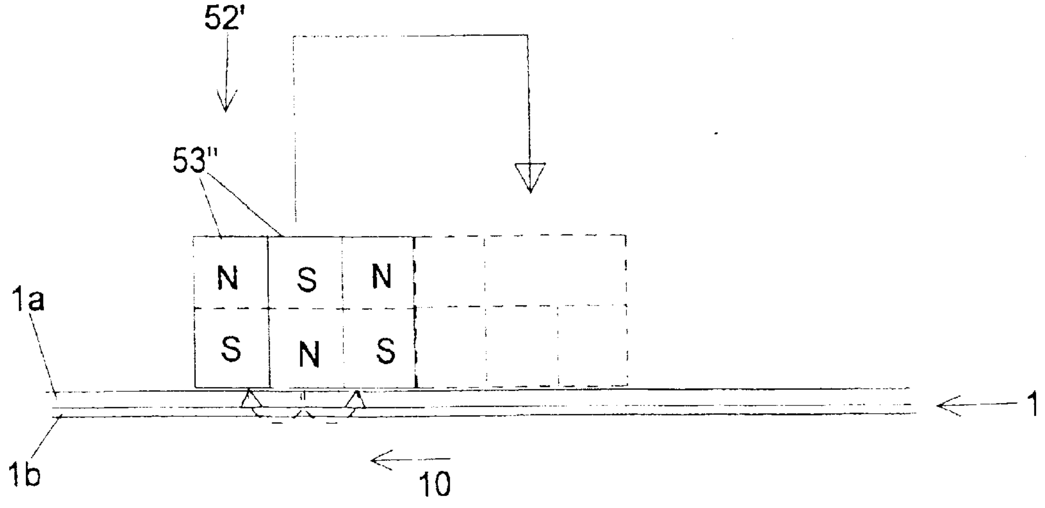
Figure 3D:
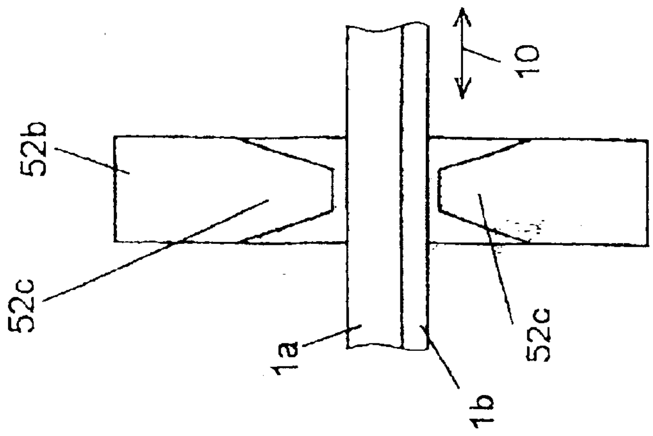
Figure 3C:
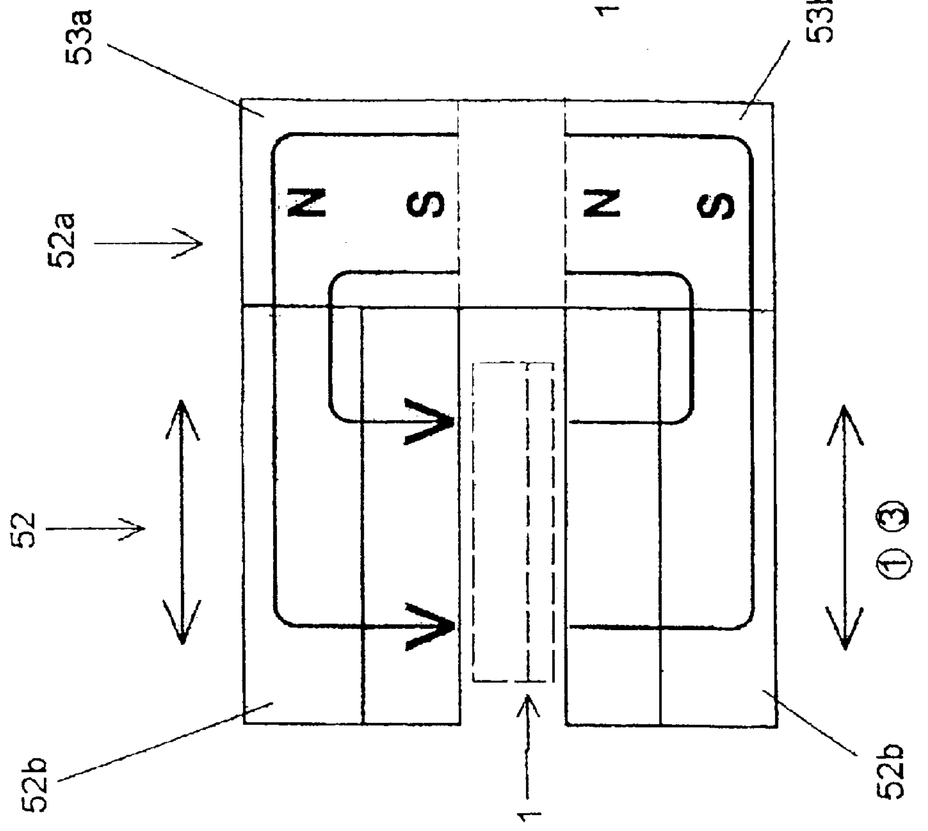
Figure 3E:
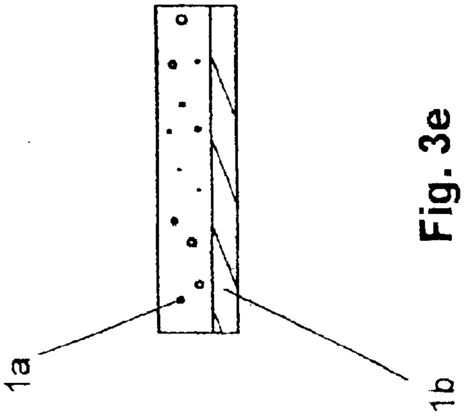

As is shown by the sectional view transversely with respect to the longitudinal direction 10 in FIG. 2*b* which is illustrated in FIG. 3*a* and separately in FIG. 3*e*, the measuring scale 1, besides the magnetisable layer 1*a*, may be supplemented for example on the underside by a yoke band 1*b* of a material which is a good magnetic conductor and which affords the return for the magnetic flux through the magnetisable layer 1*a*.

Instead of a magnet 53' which is fixedly arranged in the connecting limb 52*a* of the magnetisation head 52—as shown in the right-hand half in FIG. 2*b* and also in FIG. 3*b*—instead thereof it is possible for the magnet 53 to be adapted also to be movable out of the corresponding limb, generally the connecting limb 52*a*.

Movement of the magnet 53 out of the magnetisation head 52—just as in the case of the structure shown in FIG. 2*a*, involving rotation of the magnet—then serves for interruption of the magnetic flux between the two free ends 52*c* and thus further movement of the measuring scale 1 relative to the magnetisation head 52.

FIG. 3*c* further shows an apparatus similar to that in FIG. 3*a*, with the difference that the magnetisation head 52, instead of being C-shaped, is rather of an U-shaped configuration, that is to say, projecting from the connecting limb 52*a* are two freely cantilever limbs 52*b* which extend in parallel relationship. In that case the mutually facing parallel surfaces of those freely cantilever projecting limbs 52*b* form between them the air gap into which once again the measuring scale 1 can be introduced for the magnetisation operation. In order in that situation to focus the magnetic flux, those two freely projecting limbs 52*b*—as shown in FIG. 3*d*—are provided with a cross-section which tapers towards the air gap while, in the case of the above-described C-shape of the magnetisation head 52, such a tapering of the free ends 52*c* was provided for the same reason, preferably as considered in the longitudinal direction 10.

To interrupt the magnetic flux, once again the entire magnetisation head 52 is reciprocated relative to the measuring scale 1 and transversely with respect to the longitudinal direction 10 thereof, corresponding to the arrows ① and ①. In the case of the magnetisation head 52 also the magnet is disposed in the connecting limb 52*a* of the U-shape, but this arrangement involves two magnets 53*a*, 53*b* which are arranged symmetrically on both sides of the center of the connecting limb with mutually oppositely disposed North and South poles. If the connecting limb 52*a* with those magnets is pivotable about the axis of symmetry of the U-shape of the head 52, the magnetic flux can also be interrupted in the air gap between the free ends 52*c* by such a pivotal movement.

Figure 3F:
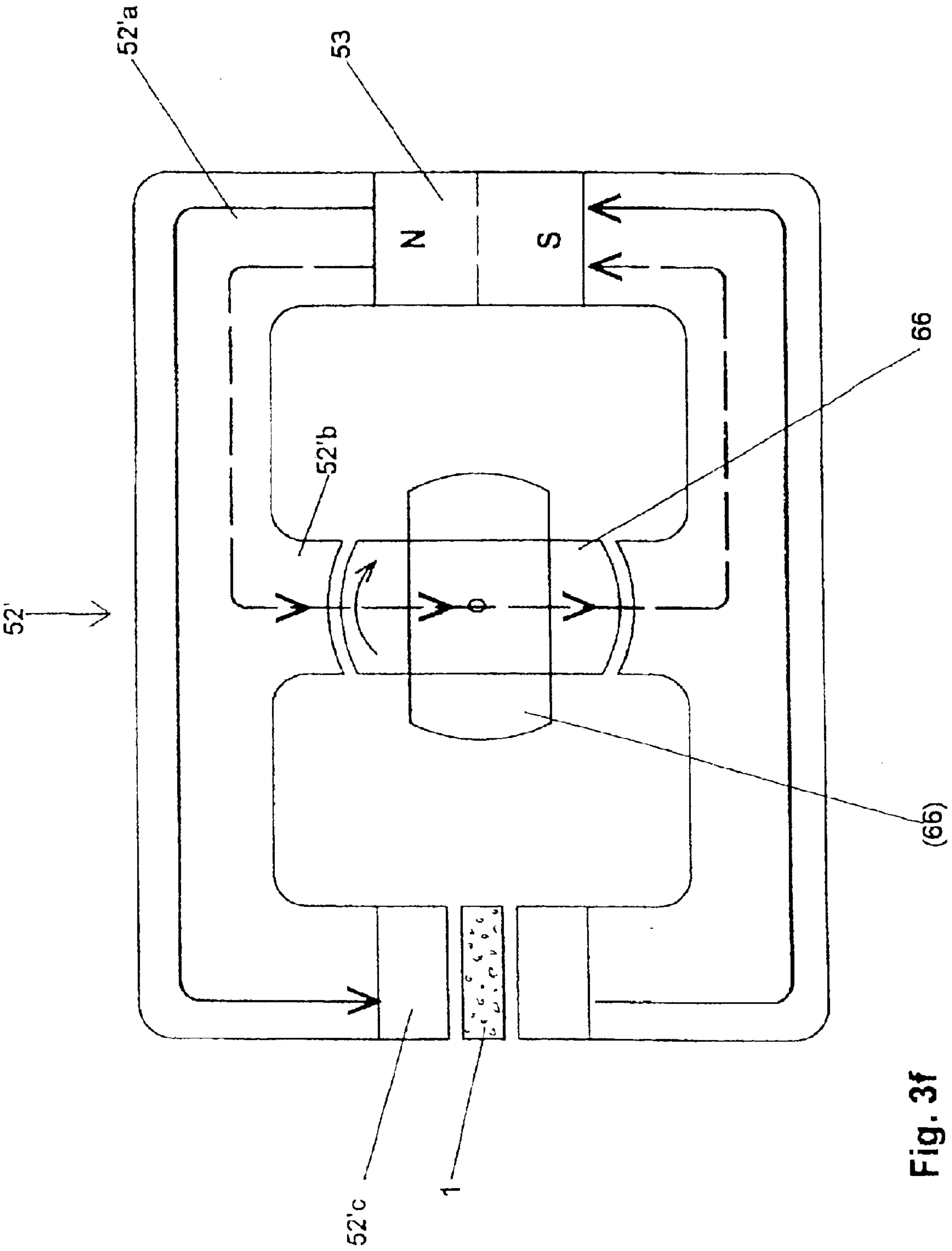

FIG. 3*f* shows a further embodiment of a magnetisation head 52' in the form of an 'eight', that is to say with three connecting limbs 52'*a, b, c*. Provided in one of the connecting limbs, preferably in an outwardly disposed connecting limb 52'*c*, is an interruption in the form of an air gap into which once again the measuring scale 1 can be introduced for the purposes of the magnetisation operation.

A magnet 53 is arranged in one of the other connecting limbs, for example the oppositely disposed limb, that is to say a connecting limb 52'*a*. An intermediate portion 66 is arranged as a flux guide portion, preferably therefore consisting of steel, in the remaining third and last connecting limb, for example the central connecting limb 52'*b*. That intermediate portion 66 can be pivoted out of the aligned position in the condition of extending lengthwise within the connecting limb 52*b* about the transverse axis thereof or can also be moved completely out of the magnetisation head 52' in the transverse direction, whereby the magnetic flux through that connecting limb 52'*b* is interrupted.

In that way it is possible to control whether the magnetic flux passes in the ring configuration between the connecting limb which carries the magnet 53 and—if the intermediate portion 66 is aligned with its connecting limb 52'*b* carrying it—by way of said intermediate portion 66 back to the magnet, with the consequence that there is no magnetic flux through the air gap and thus the measuring scale 1 disposed there.

If in contrast the intermediate portion 66 is moved or rotated out of the head 52' the magnetic flux from the magnet 53 will pass by way of the limb with the air gap and thus through the measuring scale 1 disposed there, that is to say magnetisation of the measuring scale 1 will take place.

FIG. 3*b* in contrast is a side view showing magnetisation by means of a magnetisation head 52' which is applied to the measuring scale 1 only from above but which instead already includes in succession in the longitudinal direction a plurality of magnets 53' which for example respectively alternate in their pole direction. Magnetisation of the measuring scale 1 is effected by applying the magnetisation head 52' from above, thereafter lifting it off, longitudinal displacement in the direction 10 between the magnetisation head 52' and the measuring scale 1 by the length of the magnets 53" therein, and by again applying the magnetisation head 52' to the measuring scale, wherein to provide for a regularly changing sequence of segments with respectively reversed polarity, the magnetisation head preferably has an even number of magnets 53".

A transverse movement in the plane of the band is not necessary by virtue of the magnetisation head 52' not acting from below.

Figure 4A:
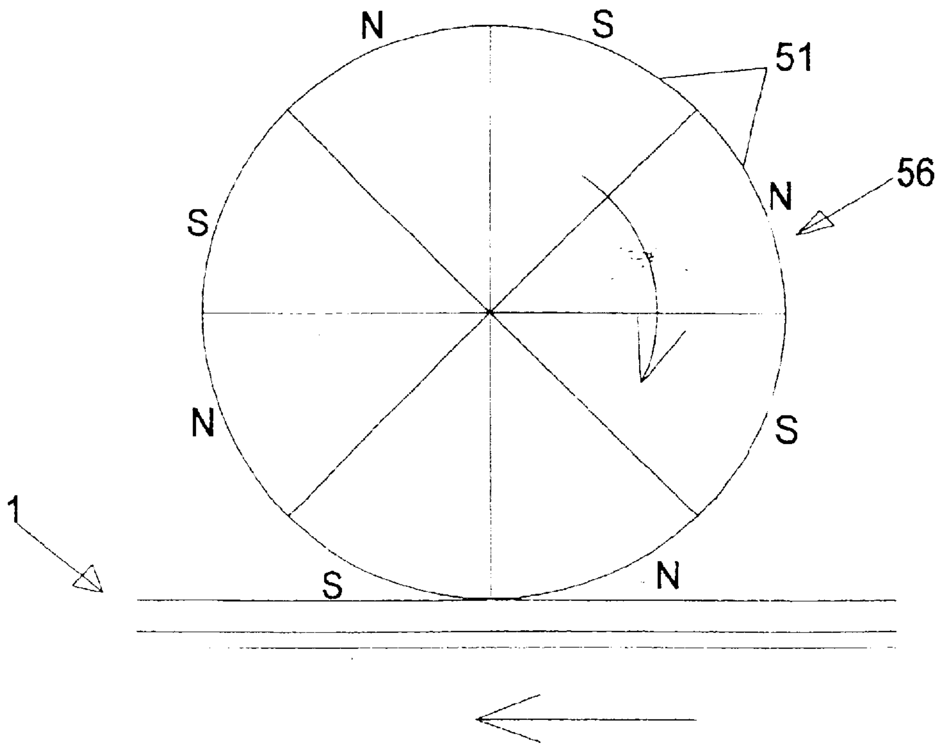
FIG. 4 shows magnetisation heads in the form of pole wheels.
Figure 4B:
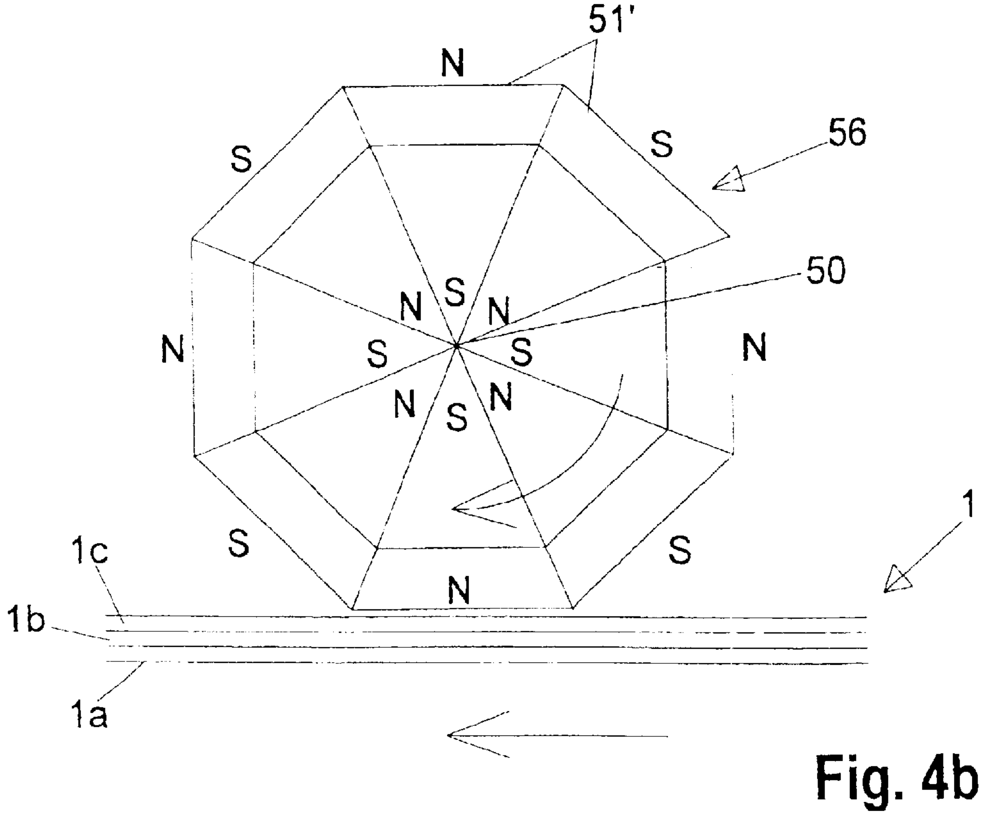

FIGS. 4*a* and 4*b* also show magnetisation heads which permit the production of an endless, regularly alternating magnetisation of segments.

This involves pole wheels, that is to say wheels which roll on the top side of the measuring scale 1 at a spacing or without a spacing therefrom, the wheels being differently magnetically polarised along their periphery.

While in this case FIG. 4*a* shows a pole wheel with a round external contour with the consequence that the entire length of a peripheral segment never bears simultaneously intimately against the top side of the measuring scale 1, FIG. 4*b* shows a pole wheel with a polygonal external periphery, wherein each of the straight peripheral segments of the polygon represents a uniformly magnetised peripheral segment 51'. When the wheel rolls against the measuring scale 1 however, in order to maintain a uniform spacing between the pole wheel 56 and the top side of the measuring scale 1 or to apply the external peripheral surfaces of the pole wheel

56 against the measuring scale, it is then necessary to take account of a periodically varying spacing between the center 50 of the pole wheel and the top side of the measuring scale 1.

In that respect FIG. 4*b* additionally shows the possibility that the top side of the magnetisable layer 1*a* of the measuring scale 1 can be covered by means of a spacer band 1*c* of a non-magnetisable material such as for example high-quality steel sheet, which affords mechanical protection for the magnetisable layer 1*a* and thus permits the magnetisation head, including in the form of a pole wheel 56, to bear directly against the top side of the spacer band 1*c*. In addition the spacer band 1*c* can be made from a material of a defined and very exactly uniform thickness, whereby it is possible to exactly maintain always the same spacings between the magnetisation head and the magnetisable layer 1*a* solely by virtue of application to the top side of the spacer band 1*c*.

Figure 4D:
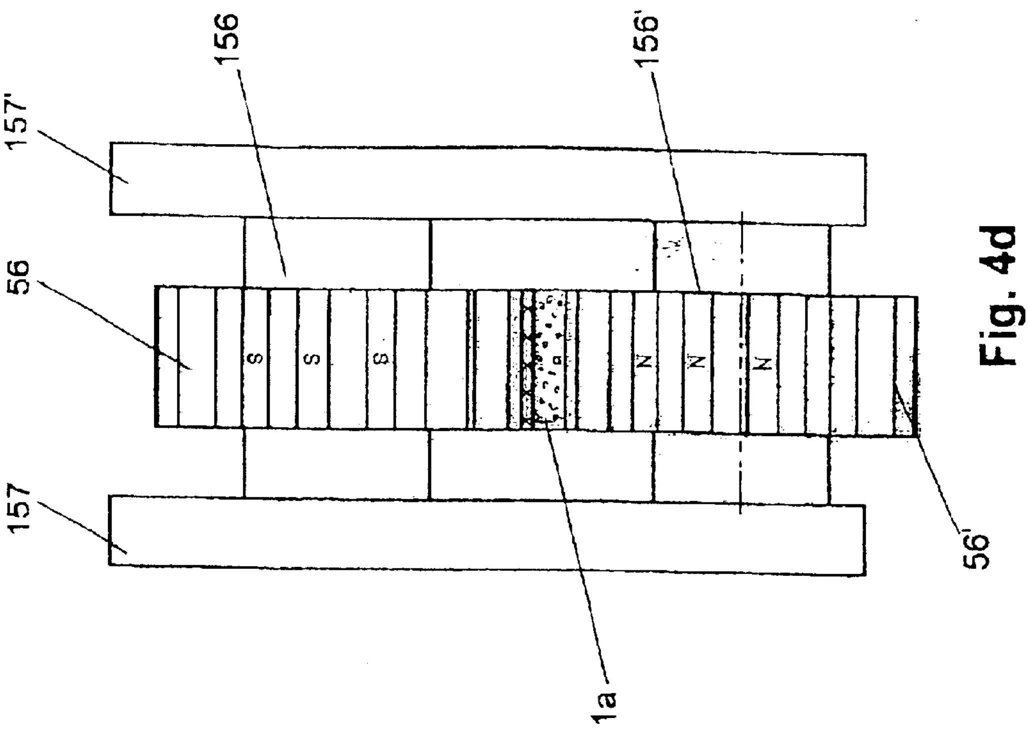
Figure 4C:
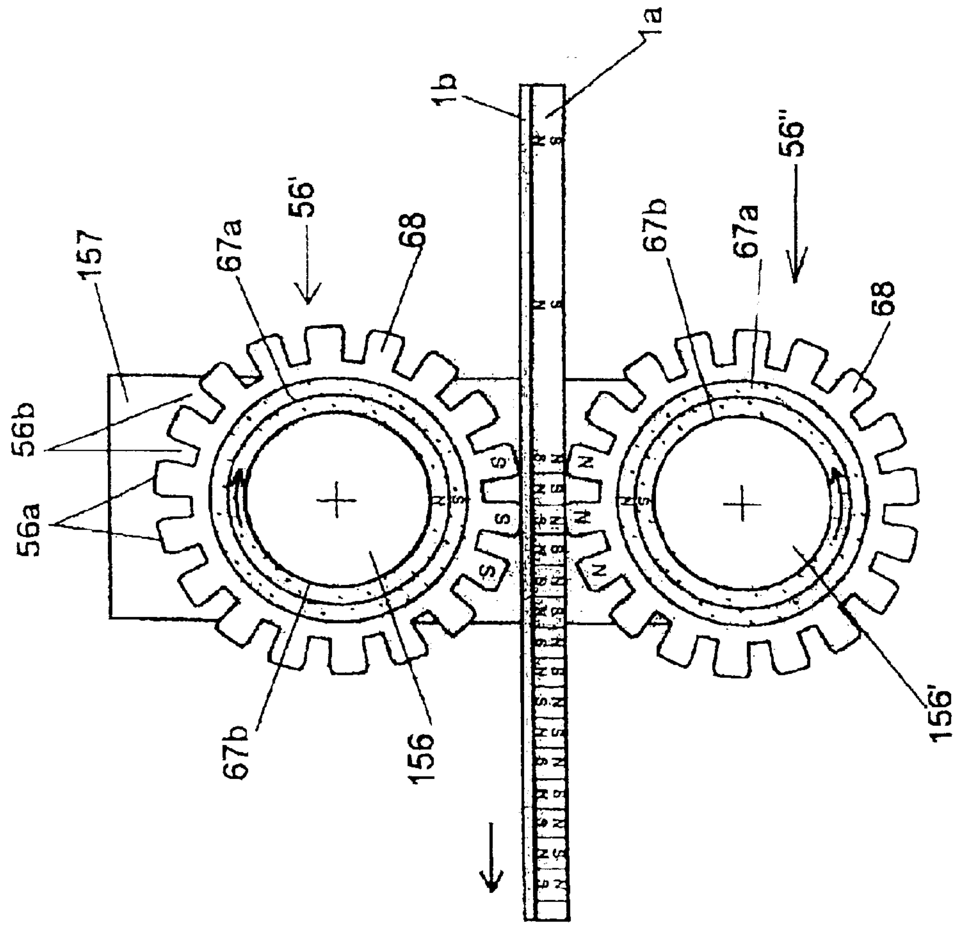

FIGS. 4*c* and 4*d* show a further possible procedure for magnetisation by means of a pole wheel. The essential difference relative to the structures in FIGS. 4*a* and 4*b* however is on the one hand that, in FIG. 4*c*, the pole wheels 56' thereof are each of identical magnetic polarity, on their external periphery. That is achieved by the pole wheel comprising a sleeve-shaped ring magnet 67 whose external periphery represents for example a South pole 67*a* while the inside thereof represents a North pole 67*b*, as shown in the upper pole wheel in FIG. 4*c*. A ring shunt 68 of for example steel or other material which opposes the least possible resistance to the magnetic flux is arranged non-rotatably on the external periphery of that ring magnet 67. At its external periphery the ring shunt 68 has projections 56*a* and recesses 56*b*, alternating in the peripheral direction, the length thereof in the peripheral direction, after being rolled on the measuring scale 1, determining the length of the different magnetisation effects produced there.

As in the described example the upper pole wheel at its external periphery involves polarisation as a South pole corresponding to the external periphery of the ring magnet 67, such a pole wheel is rolled against the top side of a measuring scale 1 in the longitudinal direction thereof, which is preferably pre-magnetised throughout in such a way that the top side hitherto represents the North pole and the underside the South pole.

By virtue of rolling the pole wheel as a South pole against the measuring scale, everywhere that the projections 56*a* of the pole wheel as a South pole are caused to approach closely to or directly contacted with the top side of the measuring scale, which is still magnetised as a North pole, magnetisation is effected in the measuring scale in such a way that there the top side now becomes the South pole and conversely the underside becomes the North pole.

In order to enhance that effect the arrangement uses a lower pole wheel 56" simultaneously rotating synchronously in opposite relationship with the upper pole wheel 56', the lower pole wheel 56" being of the reversed polarity with respect to the upper pole wheel 56', that is to say a ring magnet 67 whose external periphery 67*a* is polarised as a North pole, and similarly also the ring shunt 68 arranged non-rotatably thereon. The two pole wheels are thus preferably mechanically identical and differ only in respect of their polarity. Preferably synchronous rotation of the pole wheels is ensured in the opposite direction by a mechanical transmission. In order to optimise the flux through the measuring scale 1 to be magnetised the pole wheels 56', 56" preferably roll in contacting relationship against the top side or the underside respectively of the measuring scale 1.

In order to ensure an optimum return flux of the magnetic field lines the ring magnets 67 of the two pole wheels 56', 56" respectively rotate on a shaft 156, 156', wherein both shafts are connected together at at least one and preferably at both of their free ends, by way of a transverse yoke 157, 157'. The shafts 156, 156' and the transverse yoke 157, 157' act in this case as flux guide portions and are made from suitable material, for example steel.

FIG. 5 show—in each case as a plan view of the measuring scale 1—different magnetisation patterns of the measuring scale 1, more specifically besides regions involving regularly alternating North-South poles of the individual segments 27*a*, *b*, and more specifically over the entire width of the measuring scale 1, the production of markings in the form of two sub-tracks 57, 58, which are in each case half as wide in respect of width, on the same measuring scale.

FIG. 5*a* shows a version in which, in the region of the two sub-tracks 57, 58, the one sub-track 57 continues the regularly alternating magnetisation of the single regularly alternating main track, which was present hitherto. The other sub-track 58, with segments 27*a*, *b* of equal length, involves precisely different magnetisation in relation to that of the sub-track 57.

FIGS. 5*b* and 5*c* show the same for shorter sub-tracks of a length of only three or two segments.

Figure 1B:
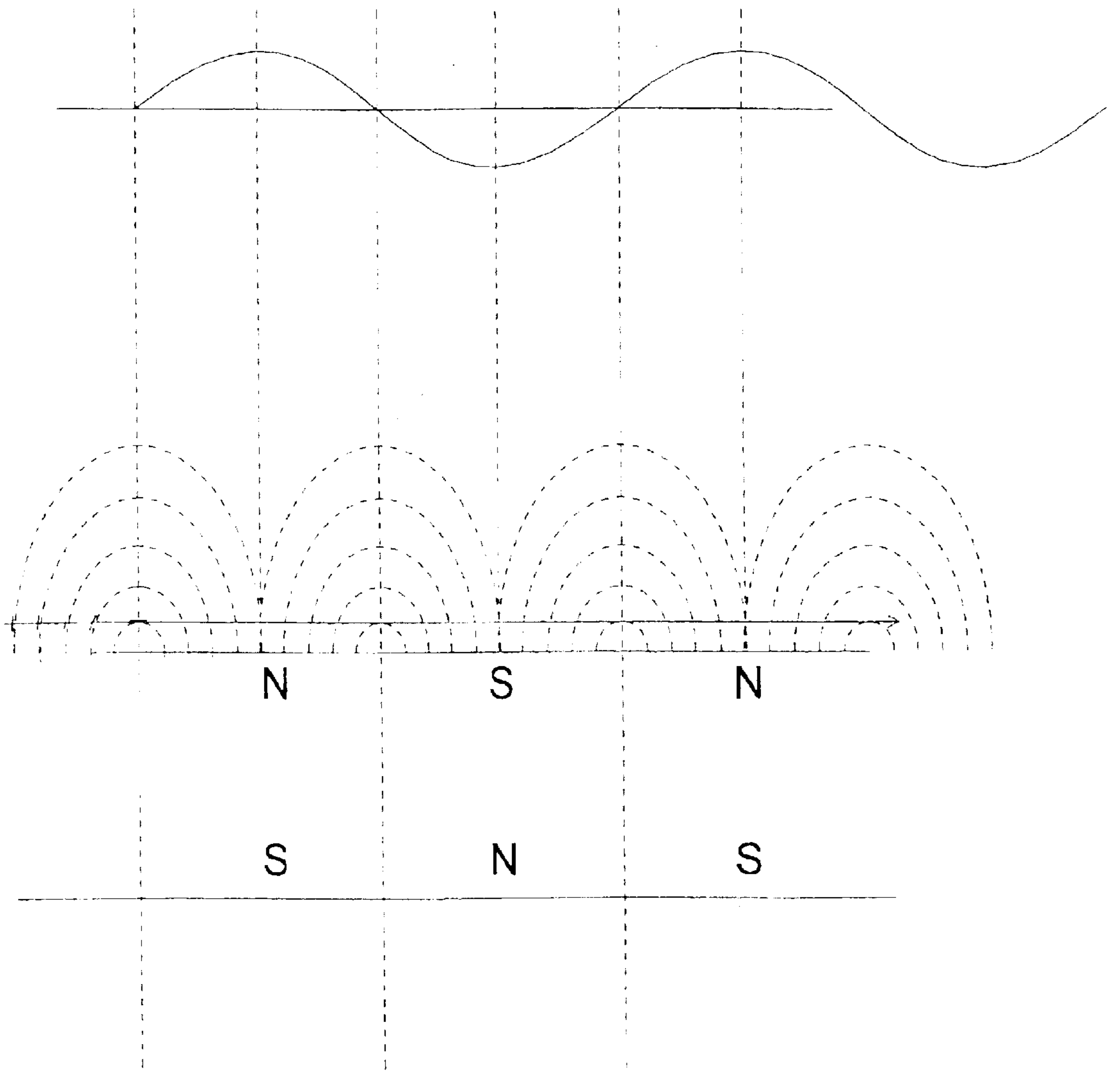
FIG. 1*b* shows the relationship between an electrical signal and magnetic flux.

In addition FIG. 5*b*1 shows how the sub-track 58 with the marking which is not regular throughout in relation to the main track can be produced:

For that purpose, a magnetisation head 52—which includes either only a single segment or a sequence of segments in the longitudinal direction—has to be pushed in the transverse direction only as far as the center of the main track, on to the corresponding segment of a sub-track, over the measuring scale 1, and then the desired magnetisation effect which differs from the remaining, uninfluenced sub-track, is applied.

FIG. 5*d* shows a marking in the form of two sub-tracks which is not disposed at the end of a measuring scale 1 but in the central region thereof and which in addition on the two sub-tracks admittedly has the same sequence of poles in the longitudinal direction, but with a transitional location, which differs in the longitudinal direction, from the North pole to the South pole on the various sub-tracks.

That can be produced (see FIG. 5*d*1) on a measuring scale 1 which is magnetised throughout uniformly over the entire width regularly and alternately and in which a magnetisation head 52 involving a suitable pole direction is advanced from that side of the measuring scale 1 at which a differing length of the segments is to be achieved, in displaced relationship in the longitudinal direction with respect to the previous segment limit, as far as the longitudinal center of the measuring scale 1, thereby implementing local reversal of the magnetisation of the measuring scale 1, as shown in FIG. 5*e*.

As a result in the unchanged upper sub-track, as shown in FIG. 5*d*, in relation to the lower sub-track, there is admittedly a pole sequence which remains the same in regard to the succession but in which the North pole is of a smaller lengthwise extent and the South pole is of a lengthwise extent which is larger than same.

The magnetisation effects in sub-tracks, which are shown in FIG. 5 and which are continued non-uniformly in relation to the regularly alternately magnetised main track but which can also extend over the entire width can be detected by the appropriate sensor 102' in the sensor unit as an end marking, a zero point marking or the like.

Figure 6A:
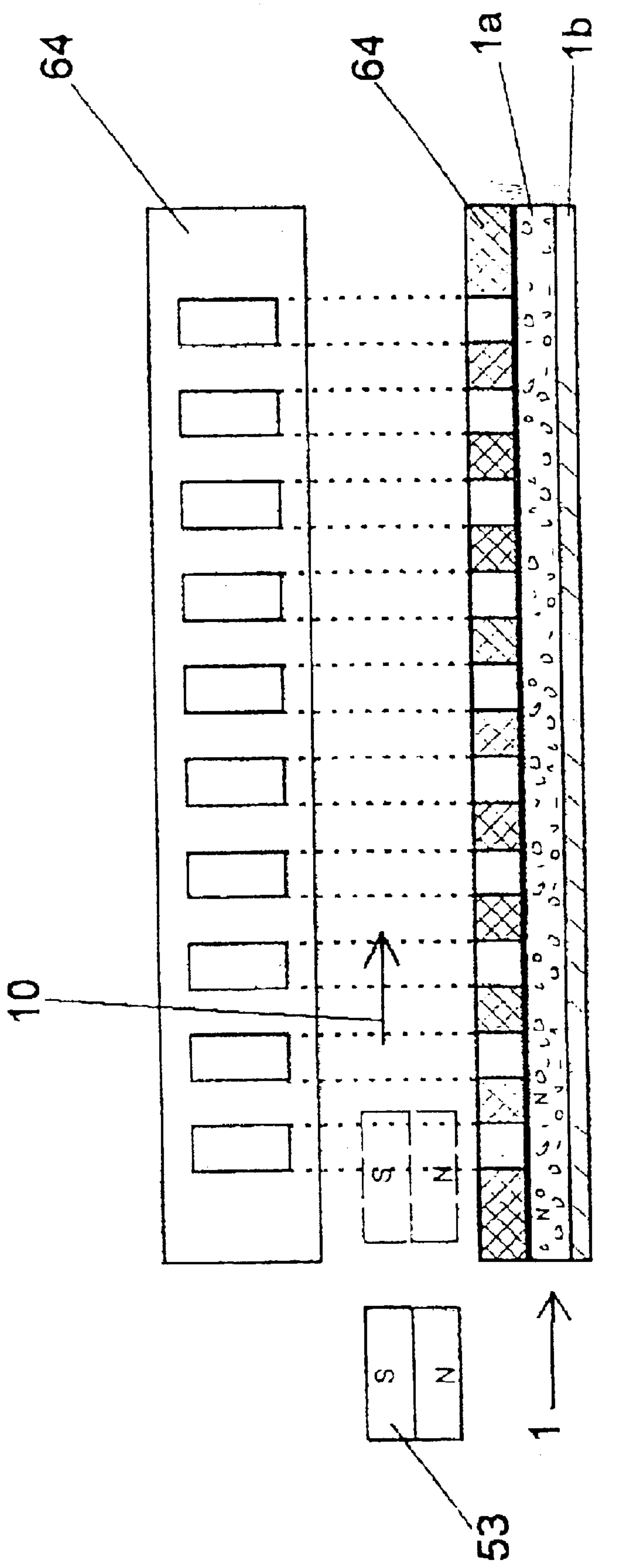
FIG. 6 shows a further magnetisation method.
Figure 6B:
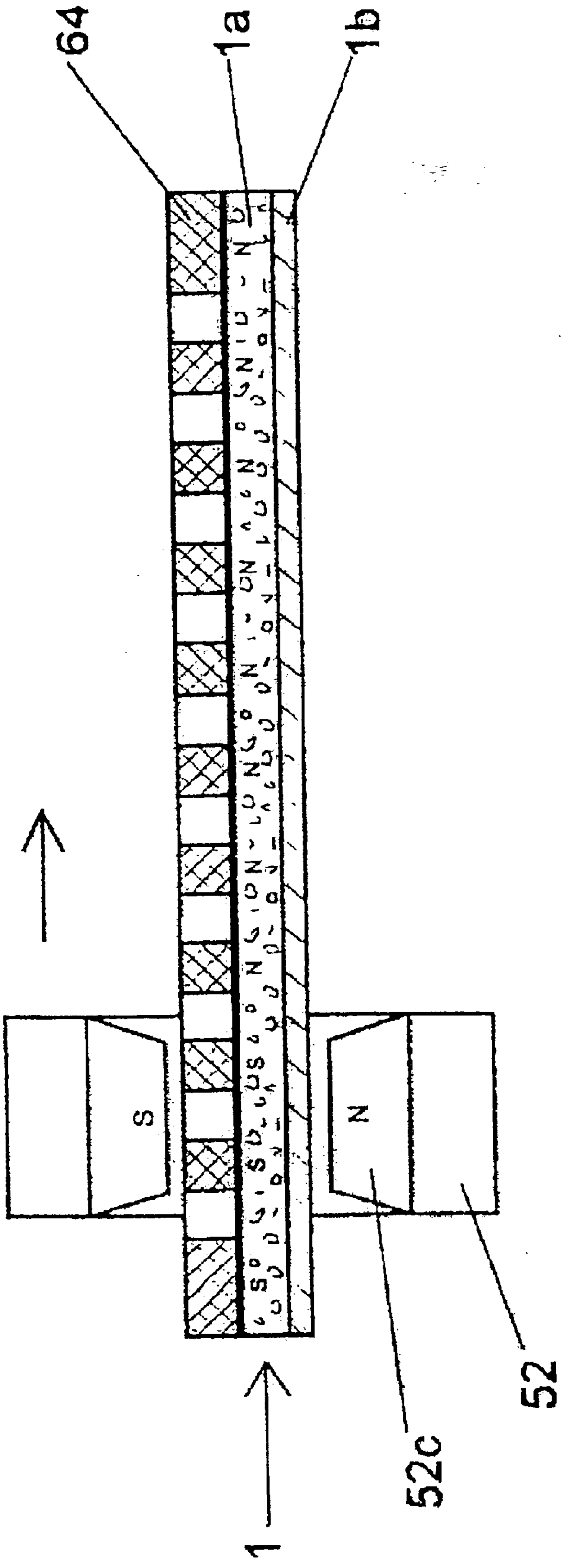

FIGS. 6*a* and 6*b* show a further magnetisation method. In this case also a band which is already pre-magnetised is preferably used in such a way that the top side thereof is for example magnetised throughout as the North pole and the underside is magnetised throughout as the South pole. As shown in FIG. 6*a*, the stepwise reversal of magnetisation to the opposite polarity of that magnetic layer 1*a* which is later to be used as the measuring scale 1 and which is preferably backed on one side by a yoke band 1*b* is effected by a magnet 53 with its magnetisation axis in alignment with the magnetisation axis of the pre-magnetised layer 1*a* being moved in the longitudinal direction 10 along the measuring scale 1. It will be noted however that disposed between the magnet 53 and the corresponding side of the magnetisable layer 1*a* on the latter is a flux stencil or template 64 comprising material which is a good magnetic conductor, for example steel, in which there are openings 65 provided at regular spacings in the longitudinal direction 10 of the measuring scale 1.

The magnet 53 is passed as closely as possible over the flux template 64, in particular in contact therewith. The flux which is facilitated by virtue of the material of the flux template 64 produces, at the side of the magnetisable layer 1*a* which bears against the flux template 64, the same polarity with which the magnet 53 faces towards the flux template 64, but only where there is material of the flux template 64. In contrast, in the openings 65—with an adequate thickness for the flux template 64—the air gap which is represented by those openings 65 is too great to produce a noticeable magnetic flux from the magnet 53 into the magnetisable layer 1*a*. Those regions therefore retain the optionally present pre-magnetisation of the magnetisable layer or—if there was no pre-magnetisation effect—they remain in the unmagnetised condition.

The structure shown in FIG. 6*b* differs in that, in the same manner, instead of being moved at one side along the outward side of the flux template 64, a magnetisation head which is C-shaped, U-shaped and so forth in accordance with the above-described Figures moved along the unit comprising the measuring scale 1 and the flux template 64, by virtue of that unit filling the air gap in the magnetisation head to the maximum possible degree.

It will be appreciated that supplemental thereto it is also possible to arrange on the underside of the measuring scale 1 a similar flux guide template with similarly arranged openings.

Furthermore, instead of the lengthwise movement of the magnetisation head, on the top side and/or underside, it is also possible to roll a ring magnet on said unit which is provided on the outside with a flux template and which then also no longer requires alternate raised portions and recesses, as shown in FIGS. 4*c* and 4*d*, so that this can involve an arrangement as shown in FIGS. 4*c* and 4*d*, but without its toothed external ring shunt 68. It will be appreciated that the mutual spacing of the pole wheels then also has to be suitably reduced so that the two ring magnets 67 again roll in close relationship and preferably in contacting relationship on the top side and underside of the unit comprising at least one flux template 64 and a magnetisable layer 1*a*.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

LIST OF REFERENCES

1 measuring scale
1*a* magnetic layer
1*b* yoke band
1*c* spacer band
10 measuring direction, longitudinal direction
32 band end mark
50 pole wheel center
51 peripheral segment
52, 52' magnetisation head
52'*a, b, c* magnetisation cover
52*a* central limb
53 magnet
54 flux guide portion
55 flux guide portion
56 pole wheel
56*a* projection
56*b* recess
57 sub-track
58 sub-track
60 first motion unit
61 second motion unit
63 electrical switching unit
64 flux template
65 openings
66 intermediate portion
67 ring magnet
67*a, b* poles
68 ring shunt
156, 156' shaft
157, 157' transverse yoke

What is claimed is:

1. An apparatus for magnetically measuring a length, said apparatus comprising:

- a band-shaped measuring scale having top and underneath sides;
- a magnetization head having a magnet with a pole direction and having at least one movable portion, at least one limb and at least one free end;
- a first motion unit for moving said measuring scale in a longitudinal direction thereof relative to said magnetization head; and
- a second motion unit for moving at least one part of said magnetization head relative to said measuring scale for purposes of varying the magnetic induction in an air gap between said magnetization head and said measuring scale.

2. An apparatus as set forth in claim 1 wherein said second motion unit can displace by rotational movement said magnet between an activated position in which the pole direction of said magnet is coincident with the direction in which said limb of said magnetization head in which it is disposed extends and a deactivated position in which said pole direction of said magnet and said limb are not coincident.

3. An apparatus as set forth in claim 1 wherein said second motion unit can reciprocate said magnet between an activated position in which the pole direction of said magnet coincides with the direction in which the limb of the magnetization head in which the magnet is arranged extends and a deactivated position which the two directions thereof extent are displaced in mutually parallel relationships.

4. An apparatus as set forth in claim 1 wherein said second motion unit can reciprocate said magnetization head in a transverse direction relative to the longitudinal direction of said measuring scale between an activated position in which said measuring scale is below a free end or between a free end of said magnetization head and a deactivated position in which a free end or ends of said magnetization head is remote from said measuring scale.

5. An apparatus as set forth in claim 1 wherein said first motion unit and said second motion unit both engage said magnetization head or one of the parts thereof and moves said magnetization head or a part thereof.

6. An apparatus as set forth in claim 1 having an electrical switching unit for pole reversal of an electrically excited magnet.

7. An apparatus as set forth in claim 1 wherein arranged at least in the lengthwise region of the magnetization head at least at one side and preferably at both sides of the measuring scale are flux guide portions disposed beside the measuring scale at a small spacing or in laterally contacting relationship with said measuring scale, and having a thickness corresponding at a maximum to the thickness of said measuring scale.

8. An apparatus as set forth in claim 1 wherein said free end of said magnetization head bears in contacting relationship on said top side of a magnetizable layer of said measuring scale.

9. An apparatus as set forth in claim 1 wherein said free end is guided at a defined spacing relative to said top side of the magnetizable layer of said measuring scale and in particular for maintaining the defined spacing arranged fixedly on the top side of the magnetizable layer is a spacer band of non-magnetizable, in particular high-quality steel of a pre-defined thickness, and the free end of said magnetization head bears in contacting relationship on the outside of the spacer band, which outside faces away from said magnetizable layer.

10. An apparatus as set forth in claim 1 wherein said measuring scale is provided with a regular sequence of magnetic segments and at least one irregular sequence of magnetic segments and the measuring scale is cut to a predetermined length.

11. An apparatus as set forth in claim 10 wherein the operation of applying the at least one irregular sequence of magnetic segments is effect by approaching said free end of said magnetization head to said top side of said magnetizable scale.

12. An apparatus as set forth in claim 10 wherein said the production of said irregular sequence is effected by relative displacement in a longitudinal direction and variation of the magnetic flux in said magnetization head by mechanical movement of said magnet.

13. An apparatus as set forth in claim 10 wherein said the production of said irregular sequence is effected by relative displacement in a longitudinal direction and variation of the magnetic flux in said magnetization head by altering the circuitry configuration of an electrically excitable magnet.

14. An apparatus as set forth in claim 10 wherein magnetization of said measuring scale is effected by means of passing the magnetic flux flowing in said magnetization head through the magnetizable measuring scale from said top side to said underside of said measuring scale.

15. A process as set forth in claim 10 wherein magnetization of said measuring scale is effected by introducing a magnetic flux produced in said magnetization head into said top side of said measuring scale and passing said measuring scale in a longitudinal direction through a yoke band being arranged on said underside of the magnetizable layer of said measuring scale and which extends over the entire length of said measuring scale.

16. An apparatus as set forth in claim 10 wherein upon transverse displacement of said magnetization head with respect to said measuring scale by parallel displacement with respect to said top side of said measuring scale in the transverse direction thereof the magnetic flux produced in said magnetization head is conducted outside the width of said measuring scale through at least one flux guide arranged therein.

17. An apparatus as set forth in claim 16 wherein at least one flux guide portion remains in the longitudinal direction at the position to be magnetized, in particular upon lengthwise transportation of said measuring scale it remains at the position of the magnetization head or upon longitudinal movement of said magnetization head along said measuring scale it is also moved with said magnetization head.

18. An apparatus as set forth in claim 16 wherein said at least one flux guide portion remains at the position of the magnetization head upon lengthwise transportation of said measuring scale.

19. An apparatus as set forth in claim 16 wherein at least one flux guide portion is moved with said magnetization head upon longitudinal movement of said magnetization head along said measuring scale.

20. An apparatus as set forth in claim 10 wherein application of said regular markings is effected by rolling a pole wheel in the longitudinal direction on said top side of said measuring scale and in particular the pole wheel has portions of it periphery which are of different polarity along its periphery and are of equal length.

21. An apparatus as set forth in claim 20 wherein said pole wheel has a round periphery.

22. An apparatus as set forth in claim 21 wherein said pole wheel along its periphery has alternately projections and recesses of the same polarity which extend over the entire width of said measuring scale wherein the projections on the one hand and the recesses on the other hand are of respectively identical polarity.

23. A magnetization installation for the magnetization of a band-shaped measuring scale, said installation comprising:

a magnetization head having a magnet and at least one free end;

a first motion unit for moving said measuring scale in a longitudinal direction thereof relative to the magnetization head; and at least one cover bearing on at least one side of the measuring scale which is toward the free ends of said magnetization head and remains at rest relative to the measuring scale in the magnetization procedure, wherein the cover has openings recurringly at those locations through which magnetization of the measuring scale is to be effected by means of the magnetization head.

24. A process for producing irregular sequences of magnetic segments on a magnetizable measuring scale having otherwise regular sequences of magnetic segments, said process comprising the following steps:

a measuring scale having a top side and an underside is firstly provided with a regular sequence of magnetic segments;

at least one irregular sequence of magnetic segments is applied; and the measuring scale is cut to length.

25. A process as set forth in claim 24 wherein the operation of applying said regular sequences is initially effected over the entire reference length of said measuring scale and the application of the least one irregular sequence is effected by reversal of the magnetization of a region of said regular sequence.

26. A process as set forth in claim 24 wherein said regular sequence is applied only in lengthwise regions of said measuring scale in which a regular sequence is later desired and the regions of the irregular sequence are un-magnetized prior to production of the irregular sequence.

27. A process as set forth in claim 24 wherein the operation of applying said at least one irregular sequence of magnetic segments is effected by approaching a free end of a magnetization head to the top side of said magnetizable measuring scale.

28. A process as set forth in claim 24 wherein said production of irregular sequence is effected by relative displacement in a longitudinal direction and variation of a magnetic flux in a magnetization head.

29. A process as set forth in claim 24 wherein magnetization of said measuring scale is effected by means of passing a magnetic flux flowing in a magnetization head through the magnetizable measuring scale from said top side to said underside of the measuring scale.

30. A process as set forth in claim 24 wherein magnetization of the measuring scale is effected by introducing the magnetic flux produced in the magnetization head into said top side of said magnetizable measuring scale and passing it on in the longitudinal direction through a yoke band which is arranged on said underside of the magnetizable layer of said measuring scale and which extends in particular over the entire length of the measuring scale.

31. A magnetization installation for the magnetization of a band-shaped measuring scale, said installation comprising:

a magnetization head which includes a magnet;

a first motion unit for moving the measuring scale in the longitudinal direction thereof relative to the magnetization head;

at least one pole wheel located on opposite sides of the measuring scale for applying the regular sequences of magnetized segments.

32. An installation as set forth in claim 31 wherein each at least one pole wheel has alternately along its periphery projections and recesses, wherein the projections are all of the same polarity.

33. An installation as set forth in claim 31 wherein each said at least one pole includes sleeves in the form of ring poles, which are disposed concentrically one in the other and which are polarized differently.

34. An installation as set forth in claim 31 wherein said magnetization head is of a C-shaped configuration and said at least one pole wheel runs in a plane parallel to a connecting limb of the C-shaped configuration.

* * * * *